United States Patent [19]

Charmot et al.

[11] Patent Number: 4,943,482

[45] Date of Patent: Jul. 24, 1990

[54] METALLIZED PARTICLES OF CROSSLINKED POLYMER, PROCESS FOR THEIR PREPARATION AND THEIR APPLICATION IN THE MANUFACTURE OF ELECTRICALLY CONDUCTIVE MATERIALS

[75] Inventors: Dominique Charmot; Jean-Francois Fiard, both of Paris, France

[73] Assignee: Rhone-Poulenc Chimie, Courbevoie, France

[21] Appl. No.: 252,924

[22] Filed: Oct. 4, 1988

[30] Foreign Application Priority Data

Oct. 5, 1987 [FR] France ................... 87 13712

[51] Int. Cl.$^5$ .................... B32B 15/08; B32B 27/28
[52] U.S. Cl. .................... 428/407; 428/403; 526/207; 526/253
[58] Field of Search ............... 428/403, 407; 526/207, 526/265

[56] References Cited

U.S. PATENT DOCUMENTS

| 3,849,172 | 11/1974 | Chin et al. ........................... 526/265 |
| 3,890,281 | 6/1975 | Angstadt et al. .................. 260/77.5 |
| 4,197,220 | 4/1980 | Rembaum et al. . | |

FOREIGN PATENT DOCUMENTS

| 57-49632 | 3/1982 | Japan . | |
| 60-262846 | 12/1985 | Japan . | |
| 61-133243 | 6/1986 | Japan . | |
| 6310210 | 10/1986 | Japan ................................. 428/407 |

OTHER PUBLICATIONS

English Language Abstract of Japanese Patent Document 57-49632.
English Language Abstract of Japanese Patent Document 61-133243.

Primary Examiner—Marion C. McCamish
Assistant Examiner—Elizabeth M. Cole
Attorney, Agent, or Firm—Finnegan, Henderson, Farabow, Garrett, and Dunner

[57] ABSTRACT

There are disclosed metallized polymer particles comprising a crosslinked polymer with an insoluble content of at least 0.5% by weight. The crosslinked polymer bears nucleophilic groups capable of complexing at least one salt of a metal with an oxidation-reduction potential higher than −0.8 V. The crosslinked polymer particles have on their surface a metallic layer comprising at least one metal having an oxidation-reduction potential higher than −0.8 V and being in the zero valency state. Also disclosed are a process for obtaining such metallized particles via a chemical route, and a method of using these metallized particles in the manufacture of electrically conductive materials, including electrically conductive adhesives and paints.

6 Claims, No Drawings

METALLIZED PARTICLES OF CROSSLINKED POLYMER, PROCESS FOR THEIR PREPARATION AND THEIR APPLICATION IN THE MANUFACTURE OF ELECTRICALLY CONDUCTIVE MATERIALS

The present invention relates to particles of crosslinked polymer, as such or in dispersion in water or in an organic liquid, a process for their preparation and their application in the preparation of electrically conductive materials, especially electrically conductive paints and adhesives. The particles of the invention are metallized on the surface by means of at least one metal in the zero valency state.

Japanese Publication No. 60-262,846/1985 discloses preparation of polyacrylonitrile particles coated with an electrically conductive metal. Such particles, which are not crosslinked, have the disadvantage of being sensitive to organic solvents and to alkaline pH values, thus restricting their field of use.

The present invention provides novel polymer particles which do not exhibit these disadvantages.

The particles of the present invention are metallized polymer particles, comprising a crosslinked polymer with an insolubles content of at least 0.5% by weight, preferably of at least 10% by weight and more preferably of at least 50% by weight, and bearing nucleophilic groups capable of complexing at least one salt of a metal having an oxidation-reduction potential higher than $-0.8$ V, preferably of at least $-0.3$ V. The particles have on their surface a metallic layer comprising at least one metal having an oxidation-reduction potential higher than $-0.8$ V, preferably of at least $-0.3$ V, and being in the zero valency state.

The term "oxidation-reduction potential" as used herein denotes those values given as measured by a standard electrochemical method at 25° C. For example, for the reaction $Ag^+ + e \rightarrow Ag$, the oxidation-reduction potential is $+0.8$ V.

The term "metallic layer" as used herein denotes at least one layer containing at least one metal. In cases where there is more than one layer, each layer can be different. The metallic layer can also be continuous.

Because the crosslinked polymer described above bears nucleophilic groups and has the complexing capability described above, the crosslinked polymer can be referred to as a complexing crosslinked polymer.

The particles of the invention may comprise such exemplary crosslinked polymers as those copolymers derived from:

20 to 70%, preferably 30 to 65% by weight, of at least one noncomplexing nonionic monoethylenic monomer (by "noncomplexing" monomer is meant a monomer which does not bear at least one nucleophilic group capable of complexing at least one salt of a metal having an oxidation-reduction potential higher than $-0.8$ V)

0 to 10%, preferably 0 to 5% by weight, of at least one ethylenically unsaturated carboxylic acid 15 to 60%, preferably 25 to 50% by weight, of at least one monoethylenic monomer bearing at least one nucleophilic group capable of complexing at least one salt of a metal having an oxidation-reduction potential higher than $-0.8$ V, preferably of at least $-0.3$ V (this monomer can be referred to as a complexing monoethylenic monomer), and 5 to 20%, preferably 10 to 20% by weight, of a nonionic crosslinkable polyethylenic monomer.

Exemplary monomers include:
as noncomplexing nonionic monoethylenic monomers:
 styrene and its derivatives, such as vinyltoluene and ethylvinylbenzene
 esters and amides of (meth)acrylic acid, such as methyl methacrylate, butyl acrylate and (meth)acrylamide
 vinyl esters such as vinyl acetate and vinyl propionate
 vinyl and vinylidene chlorides
as ethylenically unsaturated carboxylic acids:
 (meth)acrylic acid and monoethylenic diacids, such as maleic acid and itaconic acid
as complexing monoethylenic monomers:
 vinylpyridines, such as 2-vinylpyridine, 4-vinylpyridine and 2-methyl-5-vinylpyridine
 di(ethyl)aminoalkyl (meth)acrylates
 di(ethyl)aminoalkyl (meth)acrylamides
 allylamine
 ethyleneimine
 (meth)acrylonitrile
 1-vinylimidazole
 dialkylaminomethylstyrenes
 vinylpyrrolidone
as nonionic crosslinkable polyethylenic monomers:
 divinylbenzene and its derivatives
 conjugated dienes, such as butadiene
 polyallyl derivatives, such as tetraallylethylene
 polyol (meth)acrylates, such as ethylene glycol dimethacrylate
 methylenebis(acrylamide)
 bis(acrylamido)acetic acid
as well as those such as divinylpyridines and methyldivinylpyridines, which bear at least one nucleophilic group capable of complexing at least one salt of a metal having an oxidation-reduction potential higher than $-0.8$ V, preferably of at least $-0.3$ V.

Some or all of the complexing monoethylenic monomer described above may be replaced with a nonionic crosslinkable polyethylenic monomer bearing at least one nucleophilic group capable of complexing at least one salt of a metal having an oxidation-reduction potential higher than $-0.8$ V, preferably of at least $-0.3$ V.

Exemplary metals present on the surface of the particles include silver, gold, cobalt, copper, germanium, nickel, lead, palladium, platinum and tin.

The metallized particles of the invention may be present as such or in dispersion in water or in an organic liquid. The concentration of the particles in dispersion may be selected by one skilled in the art and may, for example, be as high as 95% by weight.

The metallized particles of the invention may be spherical in shape. The crosslinked polymer particles may have a diameter on the order of from 0.1 to 100 microns, preferably on the order of 0.5 to 10 microns. For a given crosslinked polymer particle diameter, a preferred metal layer thickness is approximately from 0.005 micron to 0.1 micron, more preferably from 0.05 to 0.1 micron. The particles may form a uniform population with respect to size or may comprise a mixture of uniform populations of different sizes.

The metal surface layer may correspond approximately to 10 to 60% by weight relative to the weight of the polymer, and preferably on the order of from 20 to 50%.

The particles of the invention may comprise a single layer of metal or, more preferably, multilayers of one or more metals.

The particles of the invention may be prepared by chemical metallization of crosslinked polymer particles having an insolubles content of at least 0.5% by weight, preferably of at least 10% by weight and more preferably of at least 50% by weight, and bearing nucleophilic groups capable of complexing at least one salt of a metal having an oxidation-reduction potential higher than $-0.8$ V, preferably of at least $-0.3$ V, the metallizing operation being performed through the use of at least one salt of a metal having an oxidation-reduction potential higher than $-0.8$ V, preferably at least $-0.3$ V.

Exemplary complexing crosslinked polymers which may form the particles of the invention include the copolymers already mentioned above, which are derived from at least one noncomplexing nonionic monoethylenic monomer, optionally from at least one ethylenically unsaturated carboxylic acid, from at least one complexing monoethylenic monomer and from at least one nonionic crosslinkable polyethylenic monomer.

The particles may be spherical and have a diameter on the order of from 0.1 to 100 microns, more preferably on the order of from 0.5 to 10 microns. The particles may have a uniform population with respect to size or may comprise a mixture of uniform populations of different sizes. They may be prepared according to any polymerization method known to those skilled in the art, in particular, by emulsion or microsuspension polymerization.

The chemical metallizing operation may be performed by bringing an inorganic or organic salt of the metal having an oxidation-reduction potential higher than $-0.8$ V to be deposited into contact, in liquid phase, with the particles of crosslinked polymer bearing complexing groups, and by reducing the metal to the zero valency state. Reduction of the metal thereby forms a metallic layer of the reduced metal on the surface of the particles. After reduction, the polymer again bears complexing groups.

The procedure chosen will be a function of the nature of the metal to be deposited, and may be selected from those operating procedures known to those skilled in the art.

Thus, in the case of a readily reducible metal, such as palladium or platinum, merely bringing an aqueous solution of, for example, a metal chloride or nitrate, into contact with a dispersion of particles of complexing crosslinked polymer in a mixture of water and an alcohol reducing agent, followed by heating, preferably at a basic pH, is sufficient to permit the metal to be deposited quasi-uniformly on the surface of the particles of crosslinked polymer.

Exemplary alcohol reducing agents include methanol and ethanol.

In the case of a metal such as silver having an oxidation-reduction potential of $+0.80$ V, a particularly advantageous metallizing procedure comprises bringing an aqueous solution of silver nitrate into contact, for example, with a dispersion of particles of complexing crosslinked polymer in a water/alcohol mixture, and then heating subsequent to the addition of aqueous ammonia and of a reducing agent such as formaldehyde or acetaldehyde.

In the case of a metal which is more difficult to reduce, such as copper, nickel or cobalt, an operating procedure in several steps is preferred.

The process may then comprise performing a first metallization with a salt of a metal which can be reduced more easily, such as palladium or silver, according to the operating procedures indicated above, then bringing a soluble salt, such as a sulfate or chloride, of a metal such as copper, nickel or cobalt, into contact with a dispersion of the palladium-coated or silver-coated polymer particles in a water/alcohol mixture, and then heating in the presence of, for example, $NaBH_4$, $NH_2-NH_2$, an aminoborane, or a hypophosphite.

The operating procedures described above are preferably repeated a number of times to form multilayers of metal, each layer containing at least one metal.

The metallized particles obtained may be separated from the reaction medium, for example, by decantation, and may optionally be redispersed in water or in an organic solvent. Such dispersions may contain up to 95% by weight of metallized particles.

The quantity of metal salt to be employed for preparing the metallized particles of the invention, expressed as the weight of metal, preferably corresponds to 10 to 60% relative to the weight of complexing crosslinked polymer, and is more preferably on the order of from 20 to 50%.

The metallized particles or their aqueous dispersions are stable to oxidation and are not sensitive to either organic solvents or alkaline pH values.

All these properties render the products of the invention suitable for use in, for example, the preparation of electrically conductive adhesives and paints, in microconnections and as waveguides.

The following examples are given by way of illustration and should not be considered as limiting the scope or concept of the invention.

EXAMPLE 1

The complexing crosslinked polymer employed had a uniform particle size of 2 microns. The polymer was obtained by a microsuspension polymerization of the following monomers:

| | |
|---|---|
| styrene | 65% by weight |
| divinylbenzene | 10% by weight |
| 4-vinylpyridine | 25% by weight | followed by spraying.

The insolubles content of the polymer was approximately 70% by weight. The insolubles measurement was carried out with the aid of a Soxhlet extractor, using Alundum thimbles marketed by Prolabo. The extraction was carried out with acetone for 2 hours under reflux.

The hardware employed consisted of a water bath and a 100-ml round-bottomed flask fitted with a stirrer, a condenser and a dropping funnel.

1st step of metallization 1 g of sprayed complexing crosslinked polymer was redispersed in a mixture of 5 ml of purified water and 45 ml of methanol.

3 ml of aqueous ammonia (20% by weight aqueous solution) were added, followed by 200 mg of silver nitrate dissolved in 2 ml of water.

The mixture was stirred vigorously, and then a mixture of 3 ml of aqueous ammonia (20% by weight aqueous solution) and 3 ml of formaldehyde (35% by weight aqueous solution) were slowly run in over 5 min.

The flask was then heated on the water bath to about 60° C. The solution slowly became brown in color. 3 ml of formaldehyde (35% by weight aqueous solution) were added in a single lot.

The temperature was maintained for another ½ hour, and then ambient temperature was restored.

2nd step of metallization

The dispersion of metallized polymer thus obtained was again subjected to the metallization step described above.

The supernatant was removed by decanting off.

1.25 g of particles of a light brown color were obtained.

These particles were on the order of from 2 to 2.1 microns in size. The metal layer was quasi-uniform, and had a thickness of 0.08 micron. This silver layer represented approximately 20% relative to the weight of the crosslinked polymer.

EXAMPLE 2

The hardware employed was that of Example 1.

1st step of metallization 2 g of a sprayed crosslinked polymer similar to that employed in Example 1 were dispersed in a mixture of 30 ml of demineralized water and of 20 ml of methanol. The pH was adjusted to 12 by addition of potassium hydroxide. 300 mg of palladium chloride were dissolved in 20 ml of 1 N hydrochloric acid, and 2 N potassium hydroxide was then added to a pH of 5.

This solution was run slowly into the round-bottomed flask, and the pH was then adjusted to 11 with potassium hydroxide.

The mixture was stirred for ½ hour, and was then heated to reflux.

The temperature was maintained for ¼ hour, and then returned to ambient temperature.

2nd step of metallization

The dispersion of metallized polymer thus obtained was again subjected to the metallization step described above with the aid of 500 mg of palladium chloride (instead of 300 mg) and of 40 ml of hydrochloric acid (instead of 20 ml).

The supernatant was removed by decanting off.

2.5 g of brown product were obtained.

The particle size was on the order of from 2 to 2.1 microns. The thickness of the metal layer was approximately 0.07 micron. The weight of metal represented approximately 20% relative to the weight of crosslinked polymer.

EXAMPLE 3

The hardware employed was that of Example 1.

1st step of metallization 1 g of an atomized crosslinked polymer similar to that of Example 1 was dispersed in a mixture of 5 ml of purified water and 45 ml of methanol.

3 ml of aqueous ammonia (20% by weight aqueous solution) were added, followed by 50 mg of silver nitrate dissolved in 2 ml of water.

The mixture was vigorously stirred. After 15 min, a mixture of 1.5 ml of aqueous ammonia (20% aqueous solution) and of 1.5 ml of formaldehyde (35% by weight aqueous solution) was run in slowly over 5 min.

The flask was heated on a water bath to about 60° C. A light brown color appeared. 1 ml of formaldehyde was then added in one lot. The temperature was maintained for another ½ hour, and then returned to ambient temperature.

2nd step of metallization 300 mg of nickel chloride and 30 mg of silver nitrate were dissolved in 5 ml of water. This solution was added with stirring to the dispersion of metallized polymer.

The mixture was stirred for ½ hour and then the temperature was raised to 40° C.

5 ml of an aqueous solution containing 20% by weight of hydrazine were added slowly.

At the end of the addition, the mixture was heated to 60° C. for ¼ of an hour, and was then cooled to ambient temperature.

1.2 g of metallized polymer were obtained.

The particle size was on the order of 2 microns.

The thickness of the metal layer was on the order of 0.08

We claim:

1. Metallized polymer particles comprising a crosslinked polymer with an insolubles content of at least 0.5% by weight, and bearing nucleophilic groups capable of complexing at least one salt of a metal with an oxidation-reduction potential higher than $-0.8$ V, and said particles having on their surface a metallic layer comprising at least one metal having an oxidation-reduction potential higher than $-0.8$ V and said metal being in the zero valency state.

2. The particles of claim 1, wherein said crosslinked polymer is a copolymer derived from:
   20 to 70% by weight of at least one noncomplexing nonionic monoethylenic monomer
   0 to 10% by weight of at least one ethylenically unsaturated carboxylic acid
   15 to 60% by weight of at least one monoethylenic monomer bearing at least one nucleophilic group capable of complexing at least one salt of a metal having an oxidation-reduction potential higher than $-0.8$ V, and
   5 to 20% by weight of a nonionic crosslinkable polyethylenic monomer.

3. The particles of claim 1, wherein said crosslinked polymer has an insolubles content of at least 50% by weight.

4. The particles of claim 2, wherein said crosslinked polymer is a copolymer derived from:
   30 to 65% by weight of at least one noncomplexing nonionic monoethylenic monomer
   0 to 5% by weight of at least one ethylenically unsaturated carboxylic acid
   25 to 50% by weight of at least one complexing monoethylenic monomer capable of complexing at least one salt of a metal having an oxidation-reduction potential higher than $-0.8$ V, and
   10 to 20% by weight of a nonionic crosslinkable polyethylenic monomer.

5. The particles of claim 1, wherein said metallic layer comprises at least one metal having an oxidation-reduction potential of at least $-0.3$ V.

6. The particles of claim 1, wherein said metallized polymer particles comprise particles of a crosslinked polymer having a diameter of from about 0.1 to 100 microns and wherein said metallic layer has a thickness of from about 0.05 to 0.1 micron.

* * * * *